United States Patent [19]
Mahler

[11] 3,882,116
[45] May 6, 1975

[54] PREPARATION OF PERCHLORINATED HETEROCYCLIC COMPOUNDS

[75] Inventor: Walter Mahler, Wilmington, Del.

[73] Assignee: E. I. du Pont de Nemours & Company, Wilmington, Del.

[22] Filed: May 9, 1972

[21] Appl. No.: 251,654

[52] U.S. Cl. ...... 260/248 C; 260/250 R; 260/250 B; 260/251 R; 260/290 HL
[51] Int. Cl.. C07d 55/42; C07d 51/36; C07d 51/76
[58] Field of Search ........ 260/248 C, 250 R, 250 B, 260/251 R, 290 HL

[56] References Cited
UNITED STATES PATENTS
3,583,988   6/1971   Johnston et al. ............. 260/290 HL

*Primary Examiner*—John M. Ford

[57] ABSTRACT

Cyanuric chloride and hexachlorobenzene can be heated to give a mixture of the tetrachloropyrazine, tetrachloropyrimidine and pentachloropyridines together with the starting materials. Furthermore, any one of the heterocyclics, with or without hexachlorobenzene, can be heated to give a mixture of all.

13 Claims, No Drawings

PREPARATION OF PERCHLORINATED HETEROCYCLIC COMPOUNDS

BACKGROUND OF THE INVENTION

1. Field of the Invention

This invention relates to, and has as its principal object provision of, reaction between or among certain N-heterocyclic compounds, with or without the presence of hexachlorobenzene.

2. Prior Art

W. H. Taplin III (U.S. Pat. No. 3,420,833) substantially completely overcame tar formation in the vapor-phase chlorination of aromatic nitrogen heterocycles by carrying out the chlorination in the presence of inert diluents, e.g., perchloro compounds such as tetrachloroethylene, hexachlorobutadiene and carbon tetrachloride.

C. G. Allison et al. (Chemical Communications, 1969, 1200) report that, during the reaction of tetrachloropyridazine with potassium fluoride to prepare tetrafluoropyridazine, rearrangement occurred to give tetrafluoropyrimidine. Pyrolysis of tetrafluoropyridazine over silica wool at 820°C at a contact time of 40 seconds yielded 60% of tetrafluoropyrimidine and 3% of tetrafluoropyrazine and confirmed that the rearrangement was a thermal reaction. Subjection of tetrafluoropyridazine to the radiation from a medium pressure mercury lamp gave an almost quantitative yield of tetrafluoropyrazine.

R. D. Chambers et al., (J. Chem. Soc., 1971, 3384) report study of thermal reaarangements of perfluorodiazines, the fluorinated analogs of the perchlorinated heterocyclic compounds of the present application.

DETAILS OF THE INVENTION

In accordance with the present invention, it was initially found that cyanuric chloride and hexachlorobenzene, when heated together, give a product mixture of tetrachloropyrazine, tetrachloropyrimidine and pentachloropyridine, together with unreacted starting materials. This initial finding represents the preferred embodiment of the present invention. Subsequent investigation disclosed, however, that any one of the named heterocyclic compounds, when heated, will give a mixture of all. Hexachlorobenzene is sometimes, but not always, found amoung the products of the reaction of the heterocyclics.

The overall reaction or reactions are evidently complex and the mechanism is not fully understood. The principal reactions can be explained on the basis of equilibria between cyanuric chloride, pentachloropyridine, tetrachloropyrazine and tetrachloropyrimidine given hereinbelow as equations I to IV. In equations I, II and III $C_4N_2Cl_4$ represents the sum of the tetrachloropyrimidine isomer and the tetrachloropyrazine isomer.

I. $C_6Cl_6 + C_3N_3Cl_3 \rightleftarrows C_5NCl_5 + C_4N_2Cl_4$
II. $C_4N_2Cl_4 \rightleftarrows C_3N_3Cl_3 + C_5NCl_5$
III. $C_5NCl_5 \rightleftarrows C_4N_2Cl_4 + C_6Cl_6$
IV. $1,3\text{-}C_4N_2Cl_4 \rightleftarrows 1,4\text{-}C_4N_2Cl_4$ Equilibrium IV is far to the pyrimidine side (1,3-); $K_{eq}$ for IV is 0.04. The preferred reaction, and one making expensive products from relatively cheap reactants, is I. Experiments approaching the equilibrium of this reaction from both sides show that the equilibrium constant, $K_{eq}$, is about 6–7.

It is obvious that these equations do not completely represent the chemistry of the process and accordingly this description should not be construed as limitative.

All of the materials of interest here are perchlorinated compounds, i.e., compounds in which all hydrogen has been replaced by chlorine. Thus, cyanuric chloride

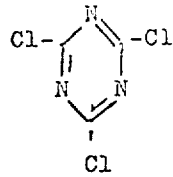

may be regarded as perchlorotriazine (2,4,6-trichloro-1,3,5-triazine or s-trichlorotriazine), tetrachloropyrazine

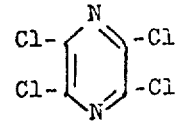

as perchloropyrazine and tetrachloropyrimidine

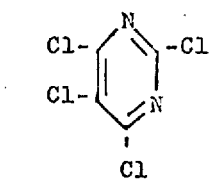

as perchloropyrimidine. Pentachloropyridine

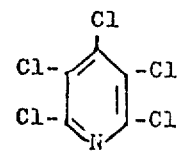

is perchloropyridine and hexachlorobenzene $C_6Cl_6$ is perchlorobenzene.

The process of the present invention is conducted by heating the starting material or materials to a temperature in the range between 350°C and 750°C with or without the addition of a Lewis acid as catalyst. When no catalyst is employed higher temperatures in the range should be employed to obtain useful conversion in a reasonable time. Usually in the absence of a catalyst the temperature will be in the range of 500° to 750°C and preferably from about 550° to 600°C. If a catalyst is employed, lower temperatures are appropriate, usually from 350° to 550°C and preferably from 400° to 550°C.

The reaction can be conducted as a batch process with heating time generally of the order of 1 to 24 hours, or as a continuous flow process using contact times at the higher temperatures of 10 seconds to 1 minute. Flow reaction can be carried out in reactors such as described by R. B. Anderson "Experimental Methods in Catalytic Research", Academic Press, New York, 1968, p 7.

Elevated pressure is useful but not essential. Autogenous pressure can be used in batch reactions. Because the materials involved have high vapor pressure at the reaction temperature, it may be desirable to apply external pressure.

The process can be carried out in vessels constructed of or lined with glass, quartz, ceramics and metals such as stainless steels, the Hastelloys, gold, platinum, copper, nickel and Monel, within their operating temperatures and pressure. For small scale laboratory experiments, capsules of gold or platinum are conveniently prepared by welding one end of tubing, charging the reactants and welding the second end of the tubing.

The rate of reaction at a given temperature can be increased by the use of Lewis acids as catalysts, particularly aluminum chloride. Lewis acids are described by D. J. Cram and G. S. Hammond in Organic Chemistry, McGraw-Hill, New York, 1959, p 179. $AlCl_3$, $BF_3$, $SnCl_4$, $ZnCl_2$, and $FeCl_3$ are listed and described as catalysts. M. F. Farona and J. F. White, J. Am. Chem. Soc., 43, 2826 (1971) teach that molybdenum carbonyls behave like Lewis acids.

The preferred reaction mixture is a mixture of hexachlorobenzene and cyanuric chloride, both of which are relatively inexpensive, and which, on heating give substantial yields of pentachloropyridine, tetrachloropyrazine and tetrachloropyrimidine, which are valuable products otherwise difficult to prepare. The hexachlorobenzene and cyanuric chloride are used in a mole ratio between about 1:10 and 10:1 and most preferably in about equimolar ratio. Other ratios are operable provided at least some cyanuric chloride is present. Pure cyanuric chloride on heating will also give some of the desired products.

Instead of a mixture of cyanuric chloride and hexachlorobenzene, any or all of the heterocyclics of interest, with or without hexachlorobenzene, can be heated to establish the desired heterocyclic products, usually pentachloropyridine and tetrachloropyrimidine. Various starting materials and mixtures are given in the examples. Accordingly, if only one of the perchloroheterocyclic compounds is desired, the reaction mixture can be extracted or otherwise treated to yield the desired compound and the undesired compounds recycled with or without the addition of cyanuric chloride and hexachlorobenzene.

Separation of any of the mixtures of the invention into components presents no problem, since the boiling points of the components are far enough apart for distillation to be used. The respective boiling points are as follows:

| | |
|---|---|
| Cyanuric chloride | 190°C |
| Tetrachloropyrazine | 230°C |
| Tetrachloropyrimidine | 238°C |
| Pentachloropyridine | 280°C |
| Hexachlorobenzene | 326°C |

Atmospheric or reduced pressure can be employed for distillation and reduced pressure is useful for fractional sublimation. Chromatography, of course, can also be used for separation of the components. A pyromellitate-packed 6-foot column at 175°C, with a helium flow rate of 75 cc/minute elutes a typical product mixture (e.g., Example 2 or 3) as follows:

| | |
|---|---|
| $C_3N_3Cl_3$ | 1.93 minutes |
| 1,4-$C_4N_2Cl_4$ | 3.16 minutes |
| 1,3-$C_4N_2Cl_4$ | 3.69 minutes |
| $C_5NCl_5$ | 6.27 minutes |
| $C_6Cl_6$ | 9.61 minutes |

Each fraction was confirmed by comparison with known material by mass spectroscopy.

Hexane at 25°C is found to extract the nitrogen-containing products of the mixture ($C_3N_3Cl_3$, $C_4N_2Cl_4$, $C_5NCl_5$) selectively. Cooling this solution to 0°C deposits $C_5NCl_5$ as a crystalline precipitate.

EMBODIMENTS OF THE INVENTION

There follow some nonlimiting examples embodying various aspects of the invention. Examples 1–5 represent preferred embodiments of the invention, i.e., those employing a mixture of cyanuric chloride and hexachlorobenzene.

EXAMPLE 1

Cyanuric Chloride and Hexachlorobenzene

A mixture of about 0.5 g each of hexachlorobenzene and cyanuric chloride was heated at 500°C for 3 hours under 1000 atmospheres pressure. The solid product was extracted with 2 ml of carbon tetrachloride (Fraction A) and the residue taken up in additional carbon tetrachloride (Fraction B). Analysis showed the relative concentrations as follows:

| | A (%) | B (%) |
|---|---|---|
| $C_3Cl_3N_3$ | 62.7 | 69.0 |
| $C_4Cl_4N_2$ | 13.0 | 4.2 |
| $C_5Cl_5N$ | 3.3 | 0.0 |
| $C_6Cl_6$ | 20.4 | 27.0 |

EXAMPLE 2

Cyanuric chloride (0.3 g) and 0.4 g of hexachlorobenzene were placed in a crimp-sealed gold tube, ⅜ inch × 3 inches. This tube was placed in a pressure vessel, argon added to a pressure of 100 atmospheres and the vessel heated to 550°C for 3 hours (argon pressure, 200 atmospheres). The pressure vessel was cooled, the argon vented, and the gold tube recovered. The contents were taken up in 5.0 cc of toluene. Analysis by gas chromatography indicated 0.098 g of cyanuric chloride, 0.009 g of tetrachloropyrazine, 0.118 g of tetrachloropyrimidine, 0.098 g of pentachloropyridine, and 0.102 g of hexachlorobenzene. From this, the total recovery was 61% and the conversions of cyanuric chloride to perchloropyrazine, perchloropyrimidine and perchloropyridine were 2.5%, 33% and 24%, respectively.

EXAMPLE 3

Cyanuric chloride (0.37 g) and 0.57 g of hexachlorobenzene were placed in a crimp-sealed gold tube ⅜ inch × 3 inches. This tube was sealed in a pressure vessel with 500 atmospheres of argon and heated to 600°C for 3 hours (argon pressure, 1000 atmospheres). The pressure vessel was cooled, the argon vented, and the gold tube recovered. The contents were taken up in 5.0 cc of toluene and the solution analyzed by gas chromatography showed 0.096 g of cyanuric chloride, 0.007 g of tetrachloropyrazine, 0.130 g of tetrachloropyrimidine, 0.172 g of pentachloropyridine, and 0.043 g of hexachlorobenzene. The total recovery was 47.7% and conversions to perchloropyrazine, perchloropyrimidine and perchloropyridine were 1.6%, 30%, and 34%, respectively.

EXAMPLE 4

In this experiment a flow tube reactor similar to that described in R. B. Anderson, loc. cit., page 7, FIG. 1a, was employed. A mixture of equimolar amounts of cyanuric chloride and hexachlorobenzene was continuously poured into a quartz tube packed with $Al_2O_3$ (a heat-transfer medium) and heated to 600°C, with a helium flow of 44 cc/minute at about 1 atmosphere pressure. After 5 g of the mixture had been passed through the tube in 10 minutes, the products that had been caught in a flask at 0°C at the exit end of the hot tube were analyzed and found to comprise 19.1% of cyanuric chloride, 5.9% of pentachloropyridine, and 75.0% of hexachlorobenzene. The pentachloropyridine fraction was confirmed by mass spectroscopy.

EXAMPLE 5

Cyanuric Chloride, Hexachlorobenzene and Catalysts

The following examples demonstrate that Lewis acids have a catalytic effect on the intermolecular rearrangement.

A. A gold tube was charged with 0.37 g of cyanuric chloride, 0.57 g of hexachlorobenzene, and 0.1 g of aluminum trichloride, sealed and heated at 500°C for 3 hours under 1000 atmospheres of argon. After cooling, the contents of the tube were analyzed and found to contain 0.046 g of cyanuric chloride, 0.004 g of tetrachloropyrazine, 0.083 g of tetrachloropyrimidine, 0.080 g of pentachloropyridine, and 0.055 g of hexachlorobenzene.

In contrast, when the above was substantially repeated as a control without the presence of aluminum trichloride, the product contained 0.239 g of cyanuric chloride, no detected tetrachloropyrazine, 0.029 g of tetrachloropyrimidine, 0.007 g of pentachloropyridine, and 0.464 g of hexachlorobenzene.

B. A glass tube was charged with 0.37 g of cyanuric chloride, 0.57 g of hexachlorobenzene and 0.1 g of $AlCl_3$. Air was evacuated from the tube which was then sealed and heated at 400°C for 24 hours. At the end of the heating period, the tube was cooled, opened and analyzed. There was found to be 0.198 g of cyanuric chloride, 0.006 g of tetrachloropyrimidine, 0.014 g of pentachloropyridine, and 0.496 g of hexachlorobenzene.

C. Part A was substantially repeated with 0.02 g of molybdenum hexacarbonyl, 0.37 g of cyanuric chloride and 0.57 g of hexachlorobenzene. The product was found to contain 0.20 g of cyanuric chloride, 0.074 g of tetrachloropyrimidine, 0.036 g of pentachloropyridine, and 0.422 g of hexachlorobenzene.

D. Part A was substantially repeated with 0.1 g of ferric chloride, 0.37 g of cyanuric chloride and 0.57 g of hexachlorobenzene. Analysis showed the product to contain 0.042 g of cyanuric chloride, 0.084 g of tetrachloropyrimidine, 0.004 g of tetrachloropyrazine, 0.068 g of pentachloropyridine and 0.159 g of hexachlorobenzene.

The effect of catalyst on approaching equilibrium $$C_6Cl_6 + C_3N_3Cl_3 \rightleftarrows C_5NCl_5 + C_4N_2Cl_4$$

is summarized in the following Table:

| Example | Temperature °C/hrs. | Catalyst | $K_{eq}$ "Forward" Reaction | "Reverse" Reaction |
|---|---|---|---|---|
| 5B | 400/24 | $AlCl_3$ | $8 \times 10^{-4}$ | — |
| — | 450⁽¹⁾/3 | none | $<10^{-6}$ | — |
| 5A | 500/3 | None (control) | $2.3 \times 10^{-3}$ | — |
| 5A | 500/3 | $AlCl_3$ | 2.52 | — |

-Continued

| Example | Temperature °C/hrs. | Catalyst | $K_{eq}$ "Forward" Reaction | "Reverse" Reaction |
|---|---|---|---|---|
| 5C | 500/3 | $Mo(CO)_6$ | $3 \times 10^{-2}$ | — |
| 5D | 500/3 | $FeCl_3$ | $8 \times 10^{-2}$ | — |
| — | 550⁽¹⁾/3 | none | 1.1 | — |
| — | 575⁽¹⁾/3 | none | 3.7 | 11 |
| 3 | 600/3 | none | 5.2 | 8.7⁽²⁾ |

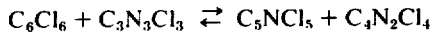
⁽¹⁾As Example 2 except for temperature.
⁽²⁾As Example 3 using 2 mmoles each of pentachloropyridine and tetrachloropyrimidine.

EXAMPLE 6

Cyanuric Chloride Alone

Cyanuric chloride (0.5 g) was sealed in a gold tube and heated at 600°C for 3 hours with an external pressure of 1000 atmospheres. After cooling, the contents were found to be 0.417 g of cyanuric chloride, 0.002 g of tetrachloropyrazine, 0.041 g of tetrachloropyrimidine, and 0.002 g of pentachloropyridine, but no hexachlorobenzene.

EXAMPLE 7

Tetrachloropyrimidine and Hexachlorobenzene in essentially the procedure of Example 2, 0.44 g of tetrachloropyrimidine and 0.57 g of hexachlorobenzene were heated for 3 hours at 600°C to give 0.008 g of cyanuric chloride, 0.003 g of tetrachloropyrazine, 0.040 g of tetrachloropyrimidine, 0.224 g of pentachloropyridine, and 0.231 g of hexachlorobenzene.

The total recovery in this example was 54% and the conversions (of tetrachloropyrimidine) to tetrachloropyrazine, tetrachloropyridine and cyanuric chloride were 3%, 44%, and 9.8%, respectively.

EXAMPLE 8

Tetrachloropyrimidine Alone

Tetrachloropyrimidine (0.5 g) was sealed in a gold tube and heated at 550°C for 3 hours with 200 atmospheres external pressure. When the tube was opened, there was found 0.090 g of cyanuric chloride, 0.011 g of tetrachloropyrazine, 0.205 g of tetrachloropyrimidine, 0.062 g of pentachloropyridine, and 0.004 g of hexachlorobenzene.

EXAMPLE 9

Pentachloropyridine and Cyanuric Chloride

A gold tube was charged with 0.3 g of cyanuric chloride and 0.4 g of pentachloropyridine. The tube was closed, placed in a pressure vessel with 500 atmospheres of argon and heated to 525°C. After the vessel was cooled and vented the gold tube was opened and the contents were taken up in 5.0 cc of toluene and analyzed. Analysis showed 0.247 g of cyanuric chloride, 0.073 g of tetrachloropyrazine, 0.125 g of tetrachloropyrimidine, and 0.251 g of pentachloropyridine. The total material accounted for was 99.5%. This example shows that a complete "redistribution" of nitrogen (and ≡ CCl) groups occurred.

EXAMPLE 10

Pentachloropyridine and Tetrachloropyrimidine

Pentachloropyridine (0.50 g) and 0.44 g of tetrachloropyrimidine were combined and sealed in a gold tube. The tube was heated at 600°C for 3 hours with an external pressure of 1000 atmospheres. After cooling, the products were analyzed and shown to be 0.088 g of cyanuric chloride, 0.010 g of tetrachloropyrazine, 0.160 g of tetrachloropyrimidine, 0.211 g of pentachloropyridine and 0.042 g of hexachlorobenzene.

EXAMPLE 11

Pentachloropyridine Alone

Pentachloropyridine (0.5 g) was sealed in a gold tube and heated at 600°C for 3 hours with 1000 atmospheres external pressure. After cooling, the contents were found to be 0.003 g of trichlorotriazine, 0.001 g of tetrachloropyrazine, 0.022 g of tetrachloropyrimidine, 0.128 g of pentachloropyridine, and 0.103 g of hexachlorobenzene.

EXAMPLE 12

Tetrachloropyrazine Alone

Tetrachloropyrazine (0.3 g) was sealed in a gold tube and heated at 525°C for 3 hours with an external pressure of 200 atmospheres. After cooling, the tube was found to contain 0.050 g of trichlorotriazine, 0.018 g of tetrachloropyrazine, 0.159 g of tetrachloropyrimidine, 0.029 g of pentachloropyridine, and less than 0.001 g of hexachlorobenzene.

The perchlorinated reactants/products of the present process are known compounds of various utilities. Pentachloropyridine, for example, is useful in controlling vegetation such as wild oats: U.S. Pat. No. 3,420,833, W. H. Taplin, III (Dow Chemical Company).

Tetrachloropyrimidine is an effective antifungal and sporicidal agent: U.S. Pat. No. 3,227,612, H. Gershon (Pfister Chemical Works, Inc.). Its use as a crosslinking agent for textile finishes with high molecular weight compounds containing hydroxy groups is described in German Pat. No. 1,215,875. The use of tetrachloropyrimidine in preparing copperized reactive formazan dyes is given in German Pat. No. 1,186,963 to W. Steinemann (Sandoz), and the treatment of disperse azo dyes with tetrachloropyrimidine to give fast dyes for polyamides is described in British Pat. No. 938,078 (Sandoz).

The embodiments of the invention in which an exclusive property or privilege is claimed are defined as followed:

1. The process of obtaining a mixture of at least three of the perchlorinated compounds, cyanuric chloride, perchloropyrazine, perchloropyrimidine and perchloropyridine which comprises heating, at a temperature, in the range of about 350° to 750°C., a reaction charge consisting initially of hexachlorobenzene and one or two of said compounds.

2. The process of claim 1 wherein said reaction charge is hexachlorobenzene and cyanuric chloride.

3. The process of claim 2 in which the temperature is about 550° to 600° C.

4. The process of obtaining a mixture of at least three of the perchlorinated compounds cyanuric chloride, perchloropyrazine, perchloropyrimidine and perchloropyridine which comprises heating, at some temperature in the range of about 350° to 750°C., a reaction charge consisting initially of one or two of said compounds, and a Lewis acid catalyst.

5. The process of claim 4 wherein the temperature is from 400° to 550°C.

6. The process of claim 5 in which the catalyst is aluminum trichloride.

7. The process of claim 5 in which the catalyst is molybdenum hexacarbonyl.

8. The process of claim 5 in which the catalyst is ferric chloride.

9. The process of obtaining a mixture of at least three of the perchlorinated compounds, cyanuric chloride, perchloropyrazine, perchloropyrimidine and perchloropyridine which comprises heating, at a temperature, in the range of about 350° to 750°C., a reaction charge consisting initially of hexachlorobenzene and one or two of said compounds, and a Lewis acid catalyst.

10. The process of claim 9 wherein the temperature is from 400° to 550°C.

11. The process of claim 10 in which the catalyst is aluminum trichloride.

12. The process of claim 10 in which the catalyst is molybdenum hexacarbonyl.

13. The process of claim 11 in which the catalyst is ferric chloride.

* * * * *